United States Patent Office 2,723,048
Patented Nov. 8, 1955

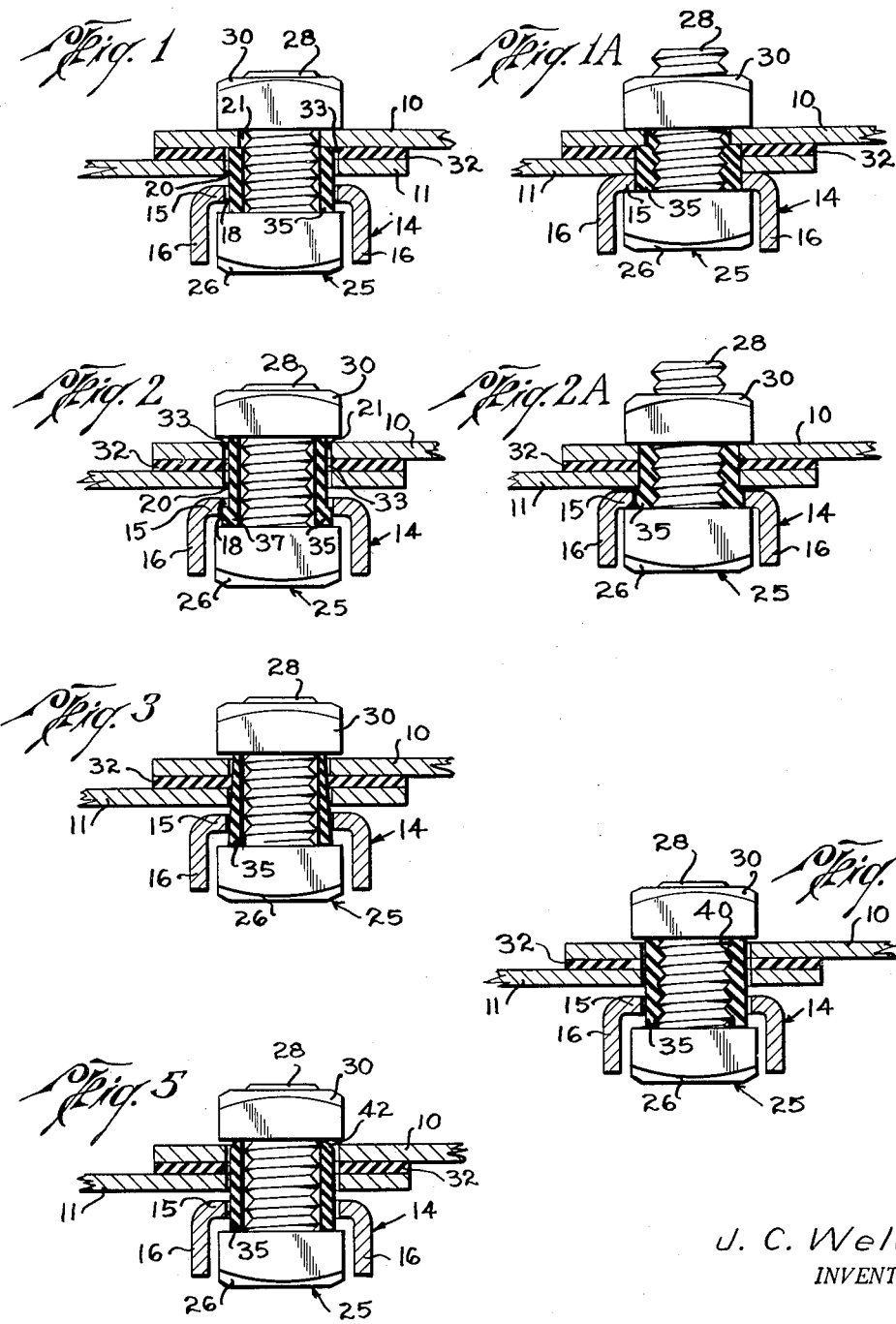

2,723,048

SEALING CONNECTION FOR BOLTED TANKS

Joseph C. Welch, Houston, Tex.

Application December 5, 1951, Serial No. 259,916

2 Claims. (Cl. 220—81)

This invention relates to a bolted connection of sealed construction which is primarily to be used in the assembling of tank plates.

This application is on an improvement of the United States Patent No. 2,159,346 issued to Joseph C. Welch and Marshall P. Wilder.

The device of the above identified patent has been found to be lacking in various aspects. The main purpose of the construction in the above patent and in this application is to provide a sealed connection for bolting together two overlapping tank plates. Prior to the Welch-Wilder patent the practice had been to simply bolt together tank plates without using any sealing means whatsoever. The Welch-Wilder patent was a considerable advance in the art, since it provides for a connection which eliminated leakage for a considerable length of time. However, considerable weaknesses have been found in the construction described in the Welch-Wilder patent, among which is the deterioration of the sealing sleeve and the sealing sheet, due to the fact that the entire length of the sealing sleeve was not under compression. Instead, where the sleeve contacted the sealing sheet there was a rubber to rubber contact which was relatively flexible and which is the point at which the sheet and the sleeve break down and leak first.

It is an object of this invention to overcome the disadvantages of the Welch-Wilder patent by placing the sleeve and so constructing the related parts in the bolted connection that the entire sleeve is compressed between metallic or other hard surfaces.

Another object of this invention is to provide a sealing sleeve for slidable fittings upon a bolt to be used in a bolted tank construction, whereby the overlapping tank plates are held in position with a channel member and a bolt passing therethrough, the first of the openings in the channel member and in the tank plates being such that the sealing sleeve is compressed upon tightening the nut on the bolt between two metallic or other hard surfaced materials.

Another object of this invention is to provide a sealing connection for bolted tanks, a sleeve of such length that it is disposed between the head of the bolt and the nut thereon so that by compressing the sleeve upon the tightening of the nut the sleeve will be restrained in all directions and there will be no portion of the sleeve which is subject to deterioration, because it is not under compression.

Another object of this invention is to provide in a bolted tank construction a sealing sleeve to be fitted upon the bolt, which sleeve is of a tapered construction so that the maximum of resilient material of the sleeve is located on the inside of the tank where the fluids normally contact the sleeve.

Another object of this invention is to provide in a bolted tank construction a sleeve for a bolt wherein the sleeve has, on the inside thereof, grooves and threads which seat upon the threads of the bolt.

Another object of this invention is to provide in a bolted tank construction a sealing sleeve having a tapered end portion normally in contact with the nut positioned on the bolt when assembled for holding the tank plates together, so that the tapered end portion will be positively urged inwardly under compression toward the threads at the point of contact with the nut.

Other and further objects of this invention will become apparent when the following description is considered in connection with the accompanying drawings wherein:

Fig. 1 is an elevational view in section illustrating one form of this invention prior to the tightening of the nut on the bolt, and illustrating the use of tank plates having different sized openings therein.

Fig. 1A is an elevational view in section illustrating the form of Fig. 1 after the nut has been tightened on the bolt to compress the sealing sleeve.

Fig. 2 is an elevational view in section illustrating another form of this invention wherein the sealing sleeve extends from the bolt head to contact the nut surface prior to compression of the sleeve.

Fig. 2A is an elevational view in section illustrating the modification of Fig. 2 after the sealing sleeve has been placed under compression.

Fig. 3 is an elevational view in section of another form of this invention wherein the sealing sleeve is of tapered or reduced cross-sectional thickness, such form illustrating the appearance prior to compression of the sleeve.

Fig. 4 is an elevational view in section illustrating another form of this invention prior to compression of the sleeve, wherein the sealing sleeve has grooves or threads therein for engagement with the threads on the bolt.

Fig. 5 is an elevational view in section illustrating another form of the sleeve of this invention wherein the sleeve has a tapered end portion adjacent the nut being used, such sleeve being shown prior to compression thereof.

Referring now to Fig. 1, particularly, therein can be seen the tank plates 10 and 11 which are in overlapping relationship. The plate 11 is the inside plate of the container. The rest of the container is not shown, but this bolted construction is intended for a container adapted to hold liquids. On the inside of the plate 11 is a channel member 14 which has a web portion 15 and flanges 16. The web portion 15 has an opening 18 therein. This opening 18 is of substantially the same diameter as the openings 20 in the tank plate 11. It will be observed that the opening 21 in the tank plate 10 is of reduced diameter as compared to the openings 18 and 20 as shown in Fig. 1.

The openings 18, 20 and 21 are aligned to receive the bolt 25. This bolt 25 has therein a head 26 of preferably square or rectangular shape, the bolt 25 has a conventionally threaded shank 28 and the nut 30 is threadedly mounted on the shank 28 of the bolt 25.

To provide for sealing in the bolted connection, a seal sheet 32 having an opening 33 thereon is positioned between the overlapping plates 10 and 11. This sealing sheet may take many forms and may be made of various materials. However, it is preferably made of rubber or some resilient material, so that there will be a subjection to compression during the tightening of the bolt connection. The opening 33 in the sealing sheet 32 as shown in Fig. 1 is preferably of the same diameter as the opening 20 on the inside plate 11. This permits the sealing sleeve 35 to extend upwardly into contact with the inside surface of the plate 10. In some instances, it may be desirable to have this sleeve extend up so that it contacts the inside surface of the gasket or sealing sheet 32 in which case the opening 33 would be of substantially the same diameter as the opening 21 in the plate 10. In either event, the sealing sleeve 35 would be normal before tightening, and would extend through the openings 18 and 20, and in the form shown in Fig. 1 the ends of the sleeve 35 would be in contact with the inside surface of the plate 10 and the under-surface of the bolt head 26.

This construction is of considerable advantage, since it places the sleeve in a position so that upon tightening the nut, as shown in Fig. 1A, the sealing sleeve 35 is restrained under compression from all sides, and it has been found that the life of the sealed bolt connection utilizing this feature is greatly enhanced, largely due to the fact that no loose rubber portions of the sleeve 35 are available for deterioration, such as in the U. S. Patent #2,159,346 above referred to.

The sleeve 35 may take numerous shapes and forms, as can be seen from some of the forms illustrated in Figs. 1–5. The material of the sleeve 35 is preferably rubber, although any resilient material that is subject to compression, such as some of the synthetic plastics, would be suitable.

In the modification shown in Fig. 2, all of the elements are the same as shown in Fig. 1, except that the opening 21 is of substantially the same diameter as the openings 20, 33 and 18 instead of being of reduced diameter as in Fig. 1. This construction permits the use of a sleeve 35 which extends between the head 26 and the bolt 30 so that, also in this form, the ends of the sleeve 35 are positioned between the two metallic or other hard surfaced materials presented by the resistance of the bolt head 26 and the nut 30. In the sleeve 35 as shown in Fig. 2 there is an enlarged shoulder 37 formed on one end thereof and it is preferably on the end adjacent the bolt head 26. It will be appreciated that this shoulder 37 is not essential but that the sleeve, instead, may be of the same thickness throughout its length.

With the shoulder 37, an additional sealing is obtained between the inside plate 11 and the bolt head 26, and in some cases this additional sealing may be necessary and desirable.

The shape which the sleeve 35 takes under compression, as shown in Fig. 2A, is that of being restrained in all directions by hard surfaces except the portion in contact with the gasket 32, but since the gasket 32 extends for a considerable distance the rigidity of the union between the gasket 32 and the sleeve 35 at their juncture is sufficient to prevent deterioration of either the gasket 32 or the sleeve 35. This would also be true as explained in connection with Fig. 1.

In the modification shown in Fig. 3, the sleeve 35 is of tapered construction in that the thickness is reduced from one end thereof to the other. The thickest portion of the sleeve 35 is preferably positioned adjacent the bolt head 26, as it is at that point that the greater sealing is required, since the fluid is initially in contact therewith. This would be true, because the channel 14 and the bolt head 26 are on the inside of the tank or container holding the liquid. It will be observed that the sleeve 35 in the modification of Fig. 3 would be restrained when placed under compression by tightening the nut 30 on the bolt 25 in a manner similar to that restraint shown in Fig. 2A for the modification of the sleeve 35 in Fig. 2.

In Fig. 4 the sleeve 35 is shown prior to the tightening of the nut 30 on the bolt 25. This sleeve 35 in Fig. 4 has threads or grooves 40 on the inside surface thereof which are adapted to fit over the threads on the shank 28 of the bolt 25. This modification provides initial contact with the threads and eliminates the necessity for excessive compression of the sleeve 35 by the tightening of the nut 30 on the bolt 25. The sleeve 35 of Fig. 4 is also disposed between the two metallic surfaces presented by the nut 30 and the bolt head 26 and, similar to the construction of Figs. 2, 2A and 3, the only non-metallic contact of the sleeve 35 is with the sealing sheet or gasket 32. As explained above, due to the comparative length of the gasket 32 and also due to the fact that it is placed under compression, the two surfaces in contact on the gasket 32 and the sleeve 35 tend to flow together and are thereby placed under extreme compression without any possibility of movement with respect to each other.

In Fig. 5, a still further modification of the sleeve 35 is illustrated. That sleeve 35 has a tapered end portion 42 which is preferably located adjacent the nut 30. This tapered end portion 42 permits the sleeve to be compressed instantly and tends to direct the compression so that there is a definite sealing between the threads on the shank 28 and on the nut 30. The modification of Fig. 5 has the advantages of the modification of Figs. 1–4 in addition to the peculiar advantages explained for this modification in Fig. 5.

It is believed apparent that this invention includes the provision of a sealing connection for bolted tanks wherein various configurations of sealing sleeves may be used and wherein such sleeve is disposed between hard metallic surfaces and is further urged into contact with the sealing sheet located between the tank plates to provide a flowing compression and sealing engagement of the sleeve with the sealing sheet or gasket.

Broadly, this invention contemplates a sealing connection for bolted plates wherein a channel member is utilized for joining together such plates by means of a bolt having thereon a sealing sleeve or tube which, when positioned thereon, is placed under compression.

What is claimed is:

1. A sealing connection for bolted tanks comprising, two overlapping plates, a sealing sheet between said plates, a channel adjacent one of said plates, said channel having a web portion and flange portions, substantially aligned openings in said channel web portion, said plates and said sealing sheet, a bolt extending through said openings, said bolt having a head disposed in said channel so that said flanges prevent said head from turning, a nut on the opposite end of said bolt, a resilient preformed packing sleeve surrounding a substantial portion of the threaded bolt body and extending from said bolt head to said nut, said openings in said channel web, said plate adjacent thereto and said sealing sheet being substantially of the same diameter so that said packing sleeve before tightening of said nut normally extends through said channel web opening, said opening in said plate adjacent thereto and said sealing sheet opening so that upon tightening of said nut on said bolt, said packing sleeve is compressed into sealing abutting contact with the inside wall surface of said opening in said sealing sheet.

2. A sealing connection for bolted tanks comprising, two overlapping plates, a sealing sheet between said plates, a channel adjacent one of said plates, said channel having a web portion and flange portions, substantially aligned openings in said channel web portion, said plates and said sealing sheet, a bolt extending through said openings, said bolt having a head disposed in said channel so that said flanges prevent said head from turning, a nut on the opposite end of said bolt, a resilient preformed packing sleeve surrounding a substantial portion of the threaded bolt body and extending from said bolt head to said nut, said openings in said channel web, said plates and said sealing sheet being substantially of the same diameter so that said sleeve before tightening of said nut normally extends through said channel web opening, said opening in said plate adjacent thereto and said sealing sheet opening so that upon tightening of said nut on said bolt, said sleeve is compressed into sealing abutting contact with the inside wall surface of said opening in said sealing sheet.

References Cited in the file of this patent

UNITED STATES PATENTS

| | | |
|---|---|---|
| 1,515,996 | Buchanan | Nov. 18, 1924 |
| 2,123,035 | Ashley | July 5, 1938 |
| 2,159,346 | Welch et al. | May 23, 1939 |
| 2,277,885 | Rodanet | Mar. 13, 1942 |
| 2,527,219 | Heinrich | Oct. 24, 1950 |
| 2,560,092 | De la Mater | July 10, 1951 |
| 2,639,832 | Bergstrom | May 26, 1953 |